United States Patent
Royer

(10) Patent No.: US 9,561,747 B2
(45) Date of Patent: Feb. 7, 2017

(54) TARPAULIN RETRACTION AND EXTENSION DEVICE

(71) Applicant: Real Royer, Saint-Hyacinthe (CA)

(72) Inventor: Real Royer, Saint-Hyacinthe (CA)

( * ) Notice: Subject to any disclaimer, the term of this patent is extended or adjusted under 35 U.S.C. 154(b) by 0 days.

(21) Appl. No.: 15/055,549

(22) Filed: Feb. 27, 2016

(65) Prior Publication Data
US 2016/0332557 A1    Nov. 17, 2016

(30) Foreign Application Priority Data
May 13, 2015 (CA) .................................. 2891283

(51) Int. Cl.
- *B60P 7/02* (2006.01)
- *B60P 7/04* (2006.01)
- *B60J 11/02* (2006.01)
- *B65D 90/66* (2006.01)

(52) U.S. Cl.
CPC .......... *B60P 7/04* (2013.01); *B60J 11/02* (2013.01); *B65D 90/66* (2013.01)

(58) Field of Classification Search
CPC .............. B60P 7/04; B60J 11/02; B65D 90/66
USPC .................................................. 296/98, 100.1
See application file for complete search history.

(56) References Cited

U.S. PATENT DOCUMENTS

| | | |
|---|---|---|
| 473,292 A | 4/1892 | Campbell et al. |
| 1,318,820 A | 10/1919 | Watkins |
| 1,784,248 A | 12/1930 | Nolen et al. |
| 1,786,048 A | 12/1930 | Williams |
| 2,562,300 A | 7/1951 | Dingman |
| 2,976,082 A | 3/1961 | Dahlman |
| 2,997,967 A | 8/1961 | Malapert |
| 3,366,414 A | 1/1968 | Thompson |
| 3,384,413 A | 5/1968 | Sargent |
| 3,423,126 A | 1/1969 | Galvin et al. |
| 3,768,540 A | 10/1973 | McSwain |
| 3,785,694 A | 1/1974 | Sargent |
| 3,829,154 A | 8/1974 | Becknell |
| 3,889,321 A | 6/1975 | Moser |
| 4,027,360 A | 6/1977 | Moser |
| 4,212,492 A | 7/1980 | Johnsen |
| 4,225,175 A | 9/1980 | Fredin |
| 4,234,224 A | 11/1980 | Rosenvold |
| 4,279,064 A | 7/1981 | Simme |
| 4,302,043 A | 11/1981 | Dimmer et al. |
| 4,369,009 A | 1/1983 | Fulford |
| 4,380,350 A | 4/1983 | Block |
| RE31,746 E | 11/1984 | Dimmer et al. |

(Continued)

*Primary Examiner* — Pinel Romain

(57) ABSTRACT

A device for covering at least part of a container using a tarpaulin, comprising: a rod for rolling the tarpaulin thereonto and unrolling of the tarpaulin therefrom; a support arm mountable to the container for rotatably supporting the rod, the support arm being pivotally movable relative to the container; a rod actuator for selectively rotating the rod; and an arm biasing element for biasing the support arm towards a predetermined position. Rotating the rod using the rod actuator to roll the tarpaulin therearound moves the support arm towards a support arm first position to move the tarpaulin to a tarpaulin retracted configuration and rotating the rod using the rod actuator to unroll the tarpaulin therefrom moves the support arm towards a support arm second position to move the tarpaulin to a tarpaulin extended configuration.

25 Claims, 4 Drawing Sheets

(56) References Cited

U.S. PATENT DOCUMENTS

| | | | |
|---|---|---|---|
| 4,484,732 | A | 11/1984 | Gould |
| 4,484,777 | A | 11/1984 | Michel |
| 4,505,512 | A | 3/1985 | Schmeichel et al. |
| 4,518,193 | A | 5/1985 | Heider et al. |
| 4,529,098 | A | 7/1985 | Heider et al. |
| 4,657,062 | A | 4/1987 | Tuerk |
| 4,659,134 | A | 4/1987 | Johnson |
| 4,673,208 | A | 6/1987 | Tsukamoto |
| 4,691,957 | A | 9/1987 | Ellingson |
| 4,700,985 | A | 10/1987 | Whitehead |
| 4,834,445 | A | 5/1989 | Odegaard |
| 4,858,984 | A | 8/1989 | Weaver |
| 4,909,563 | A | 3/1990 | Smith |
| 4,915,439 | A | 4/1990 | Cramaro |
| 4,987,942 | A | 1/1991 | Eriksson |
| 4,991,901 | A | 2/1991 | Meekhof, Sr. et al. |
| 5,002,328 | A | 3/1991 | Michel |
| 5,026,109 | A | 6/1991 | Merlot, Jr. |
| 5,050,923 | A | 9/1991 | Petelka |
| 5,086,908 | A | 2/1992 | Gladish et al. |
| 5,174,625 | A | 12/1992 | Gothier et al. |
| 5,179,991 | A | 1/1993 | Haddad, Jr. |
| 5,180,203 | A | 1/1993 | Goudy |
| 5,186,231 | A | 2/1993 | Lewis |
| 5,211,440 | A | 5/1993 | Cramaro |
| 5,253,914 | A | 10/1993 | Biancale |
| 5,328,228 | A | 7/1994 | Klassen |
| 5,429,403 | A | 7/1995 | Brasher |
| 5,466,030 | A | 11/1995 | Harris et al. |
| 5,540,475 | A | 7/1996 | Kersting et al. |
| 5,542,734 | A | 8/1996 | Burchett et al. |
| 5,549,347 | A | 8/1996 | Anderson |
| 5,658,037 | A | 8/1997 | Evans et al. |
| 5,690,377 | A | 11/1997 | Denyer |
| 5,692,793 | A | 12/1997 | Wilson |
| 5,697,663 | A | 12/1997 | Chenowth |
| 5,762,002 | A | 6/1998 | Dahlin et al. |
| 5,765,901 | A | 6/1998 | Wilkens |
| 5,794,528 | A | 8/1998 | Gronig et al. |
| 5,823,067 | A | 10/1998 | Clarys et al. |
| 5,911,467 | A | 6/1999 | Evans et al. |
| 5,924,758 | A | 7/1999 | Dimmer et al. |
| 5,938,270 | A | 8/1999 | Swanson et al. |
| 5,984,379 | A | 11/1999 | Michel et al. |
| 6,135,534 | A | 10/2000 | Schmeichel |
| 6,142,553 | A | 11/2000 | Bodecker |
| 6,142,554 | A | 11/2000 | Carroll et al. |
| 6,152,516 | A | 11/2000 | Williams |
| 6,193,299 | B1 | 2/2001 | Than |
| 6,199,935 | B1 | 3/2001 | Waltz et al. |
| 6,206,449 | B1 | 3/2001 | Searfoss |
| 6,234,562 | B1 | 5/2001 | Henning |
| 6,318,790 | B1 | 11/2001 | Henning |
| 6,322,041 | B1 | 11/2001 | Schmeichel |
| 6,361,100 | B1 | 3/2002 | Koester |
| 6,435,599 | B2 | 8/2002 | Than |
| 6,478,361 | B1 | 11/2002 | Wood |
| 6,513,856 | B1 | 2/2003 | Swanson et al. |
| 6,527,331 | B2 | 3/2003 | Searfoss |
| 6,595,594 | B2 | 7/2003 | Royer |
| 6,655,726 | B2 | 12/2003 | Bergeron |
| 6,715,817 | B2 | 4/2004 | Nolan et al. |
| 6,779,828 | B1 | 8/2004 | Poyntz |
| 6,783,168 | B2 | 8/2004 | Searfoss |
| 6,805,395 | B2 | 10/2004 | Royer |
| 6,886,879 | B2 | 5/2005 | Nolan et al. |
| 6,905,161 | B2 | 6/2005 | Fliege et al. |
| 6,926,337 | B2 | 8/2005 | Poyntz |
| 7,189,042 | B1 | 3/2007 | Schmit |
| 7,506,912 | B2 | 3/2009 | Royer |
| 7,513,561 | B2 | 4/2009 | Royer |
| 7,549,695 | B2 | 6/2009 | Royer |
| 8,177,284 | B1 | 5/2012 | Royer |
| 8,641,123 | B1 | 2/2014 | Royer |
| 8,998,287 | B2 * | 4/2015 | Smith .................... B65D 90/66 296/100.18 |
| 2002/0021018 | A1 | 2/2002 | Royer |
| 2002/0043816 | A1 | 4/2002 | Johnston |
| 2002/0109371 | A1 | 8/2002 | Wheatley |
| 2002/0135199 | A1 | 9/2002 | Hanning |
| 2003/0052506 | A1 | 3/2003 | Royer |
| 2003/0090124 | A1 | 5/2003 | Nolan |
| 2003/0190209 | A1 | 10/2003 | Smith |
| 2004/0195858 | A1 | 10/2004 | Martin |
| 2010/0230994 | A1 | 9/2010 | Royer |
| 2010/0320798 | A1 | 12/2010 | Huotari et al. |
| 2011/0254310 | A1 | 10/2011 | Royer |

\* cited by examiner

TARPAULIN RETRACTION AND EXTENSION DEVICE

FIELD OF THE INVENTION

The present invention relates generally to the field of transportation, and, more particularly, to a tarpaulin retraction and extension device usable for example with open top vehicle mounted containers.

BACKGROUND

There are many systems for covering top apertures of truck-movable containers, such as open top truck trailers and the bin of dump trucks. Many such systems conveniently roll a tarpaulin covering the top aperture around a rod when the top aperture is uncovered.

A disadvantage of many such systems is that they require relatively complex and/or heavy components to operate the rod, which adds costs to the systems. For example, many such systems have their rod, which is located on top of the container, rotated by an actuator that is located closer to the ground, for example adjacent the bottom part of the container.

Against this background, there exists a need for an improved tarpaulin extension and retraction device. An object of the present invention is to provide such a device.

SUMMARY OF THE INVENTION

In a broad aspect the invention provides a device for covering at least part of a container using a tarpaulin, the container defining a container bottom wall, a container peripheral wall extending therefrom and a container top aperture delimited by the container peripheral wall substantially opposed to the container bottom wall, the container top aperture defining an aperture first end and a substantially opposed aperture second end, the tarpaulin defining a tarpaulin first end and a substantially opposed tarpaulin second end, the tarpaulin being secured to the container at the tarpaulin first end substantially opposed to the aperture second end and movable between tarpaulin retracted and extended configurations in which the tarpaulin is respectively substantially retracted from the container top aperture and extended across the container top aperture. The device includes a rod defining a rod longitudinal axis, the tarpaulin being mountable to the rod at the tarpaulin second end to allow rolling of the tarpaulin thereonto and unrolling of the tarpaulin therefrom when the rod is rotated about the rod longitudinal axis; a support arm mountable to the container for supporting the rod, the rod being rotatably mounted to the support arm so as to be rotatable about the rod longitudinal axis, wherein, when the support arm is operatively mounted to the container, the support arm is pivotally movable relative to the container about an arm pivot axis between support arms first and second positions in which the rod is respectively substantially adjacent the aperture first and second ends; a rod actuator operatively coupled to the rod for selectively rotating the rod about the rod longitudinal axis; and an arm biasing element operatively coupled to the support arm for biasing the support arm towards the support arm second position. Rotating the rod using the rod actuator to roll the tarpaulin therearound moves the support arm towards the support arm first position to move the tarpaulin to the tarpaulin retracted configuration and rotating the rod using the rod actuator to unroll the tarpaulin therefrom moves the support arm towards the support arm second position to move the tarpaulin to the tarpaulin extended configuration.

The invention may also provide a device wherein the arm biasing element is substantially elongated and defines substantially opposed arm biasing element first and second ends, the arm biasing element being mountable to the container substantially adjacent the arm biasing element first end, the arm biasing element being flexible substantially adjacent the arm biasing element second end, at least part of the arm biasing element being substantially resiliently stretchable; the support arm defines a cam surface eccentric relative to the arm pivot axis and curving therearound; and the arm biasing element is mounted to the support arm at the arm biasing element second end so that at least part of the arm biasing element is rolled against the cam surface and unrolled therefrom as the support arm moves between the support arm first and second positions, the at least part of the arm biasing element that is substantially resiliently stretchable being stretched as the arm biasing element is rolled against the cam surface and retracted as the arm biasing element is unrolled therefrom.

The invention may also provide a device wherein the cam surface is substantially arc segment shaped.

The invention may also provide a device wherein the arm biasing element includes arm biasing element first and second portions, the arm biasing element second portion being provided substantially adjacent the arm biasing element second end, the arm biasing element first portion being more easily resiliently deformable than the arm biasing element second portion.

The invention may also provide a device wherein the support arm defines support arm first and second ends, the support arm being mountable to the container substantially adjacent the support arm first end and the rod being mounted to the support arm substantially adjacent the support arm second end, the support arm defining an arm longitudinal axis extending between the support arm first and second ends; and the support arm is telescopic to allow substantially longitudinal movements of the support arm first and second ends relative to each other.

The invention may also provide a device wherein the support arm includes a support arm first element and a support arm second element substantially longitudinally movable relative to each other and defining respectively the support arm first and second ends; and a telescoping biasing element operatively coupled to the support arm first and second elements to bias the support arm first and second elements towards an equilibrium position relative to each other.

The invention may also provide a device wherein the equilibrium position corresponds to a shortest distance possible between the support arm first and second ends.

The invention may also provide a device wherein the telescoping biasing element includes a coil spring extending between the support arm first and second elements.

The invention may also provide a device further comprising an anchoring block mountable to the container substantially adjacent the aperture second end for receiving the rod when the tarpaulin is in the tarpaulin extended configuration.

The invention may also provide a device wherein the anchoring block defines a recess opening generally towards a plane containing the container bottom wall when the anchoring block is operatively mounted to the container, the recess being configured and sized for receiving the rod thereinto when support arm is in the support arm second position.

The invention may also provide a device wherein the rod actuator includes a motor mounted to the support arm and operatively coupled to the rod to selectively rotate the rod about the rod longitudinal axis.

The invention may also provide a device wherein the motor is mounted to the support arm substantially adjacent the rod.

The invention may also provide a device further comprising a universal joint provided between the motor and the rod to allow pivotal movements of the support arm relative to the rod.

The invention may also provide a device wherein the support arm is movable to a support arm third position wherein the rod is below the container top aperture and substantially adjacent the container peripheral wall.

The invention may also provide a device wherein in the support arm third position, the rod is below the arm pivot axis.

The invention may also provide a device further comprising an arm mounting element securable to the container, the support arm being pivotally mounted to the arm mounting element.

In another broad aspect, the invention provides a container covering system for covering at least part of a container, the container defining a container bottom wall, a container peripheral wall extending therefrom and a container top aperture delimited by the container peripheral wall substantially opposed to the container bottom wall, the container top aperture defining an aperture first end and a substantially opposed aperture second end, the container covering system comprising a tarpaulin defining a tarpaulin first end and a substantially opposed tarpaulin second end, the tarpaulin being securable to the container at the tarpaulin first end and movable between tarpaulin retracted and extended configurations in which the tarpaulin is respectively substantially retracted from the container top aperture and extended across the container top aperture; a rod defining a rod longitudinal axis, the tarpaulin being mounted to the rod at the tarpaulin second end to allow rolling of the tarpaulin thereonto and unrolling of the tarpaulin therefrom when the rod is rotated about the rod longitudinal axis; a support arm mountable to the container for supporting the rod, the rod being rotatably mounted to the support arm so as to be rotatable about the rod longitudinal axis, wherein, when the support arm is operatively mounted to the container, the support arm is pivotally movable relative to the container about an arm pivot axis between support arms first and second positions in which the rod is respectively substantially adjacent the aperture first and second ends; a rod actuator operatively coupled to the rod for selectively rotating the rod about the rod longitudinal axis; and an arm biasing element operatively coupled to the support arm for biasing the support arm towards the support arm second position. Rotating the rod using the rod actuator to roll the tarpaulin therearound moves the support arm towards the support arm first position to move the tarpaulin to the tarpaulin retracted configuration and rotating the rod using the rod actuator to unroll the tarpaulin therefrom moves the support arm towards the support arm second position to move the tarpaulin to the tarpaulin extended configuration.

The invention may also provide a container covering system further comprising anchoring straps extending from the tarpaulin at the tarpaulin first end and securable to the container peripheral wall below the container top aperture spaced apart therefrom.

In another broad aspect, the invention provides a method for covering at least part of a container using a tarpaulin, the container defining a container bottom wall, a container peripheral wall extending therefrom and a container top aperture delimited by the container peripheral wall substantially opposed to the container bottom wall, the container top aperture defining an aperture first end and a substantially opposed aperture second end, the tarpaulin defining a tarpaulin first end and a substantially opposed tarpaulin second end, the tarpaulin being secured to the container at the tarpaulin first end substantially opposed to the aperture second end and movable between tarpaulin retracted and extended configurations in which the tarpaulin is respectively substantially retracted from the container top aperture and extended across the container top aperture, the method using a rod supported by a support arm, the support arm being mounted to the container peripheral wall so as to be pivotable relative thereto in a pivot plane substantially perpendicular to the rod, the method comprising: with the tarpaulin at least partially rolled around the rod and said rod positioned substantially adjacent the aperture first end, turning the rod in an unrolling direction to unroll the tarpaulin therefrom; pivoting the support arm as the rod is turned to maintain the tarpaulin substantially extended as the rod is turned; and biasing the support arm so that the rod is pulled away from the aperture first end to maintain the tarpaulin substantially taut as the rod is turned.

The invention may also provide a method further comprising turning the rod in a rolling direction opposite the unrolling direction to roll the tarpaulin therearound; pivoting the support arm as the rod is turned to maintain the tarpaulin substantially extended as the rod is turned; and biasing the support arm so that the rod is pulled away from the aperture first end to maintain the tarpaulin substantially taut as the rod is turned.

In another broad aspect, the invention provides in combination, a container and a container covering system for covering at least part of the container, the container defining a container bottom wall, a container peripheral wall extending therefrom and a container top aperture delimited by the container peripheral wall substantially opposed to the container bottom wall, the container top aperture defining an aperture first end and a substantially opposed aperture second end, the container covering system comprising: a tarpaulin defining a tarpaulin first end and a substantially opposed tarpaulin second end, the tarpaulin being secured to the container at the tarpaulin first end substantially opposed to the aperture second end and movable between tarpaulin retracted and extended configurations in which the tarpaulin is respectively substantially retracted from the container top aperture and extended across the container top aperture; a rod defining a rod longitudinal axis, the tarpaulin being mounted to the rod at the tarpaulin second end to allow rolling of the tarpaulin thereonto and unrolling of the tarpaulin therefrom when the rod is rotated about the rod longitudinal axis; a support arm mounted to the container for supporting the rod, the rod being rotatably mounted to the support arm so as to be rotatable about the rod longitudinal axis, wherein the support arm is pivotally movable relative to the container about an arm pivot axis between support arms first and second positions in which the rod is respectively substantially adjacent the aperture first and second ends; a rod actuator operatively coupled to the rod for selectively rotating the rod about the rod longitudinal axis; and an arm biasing element operatively coupled to the support arm for biasing the support arm towards the support arm second position. Rotating the rod using the rod actuator to roll the tarpaulin therearound moves the support arm towards the support arm first position to move the tarpaulin to the tarpaulin retracted configuration and rotating the rod using the rod actuator to unroll the tarpaulin therefrom moves the support arm towards the support arm second position to move the tarpaulin to the tarpaulin extended configuration.

Advantageously, the proposed device can be manufactured using a relatively small quantity of materials. Also, the actuator may be represented in some embodiments by a relatively small, and therefore relatively inexpensive, electric motor. In some embodiments, the support arm may pivot to positions covering a relatively large angular range of positions, which is required in some applications.

Other objects, advantages and features of the present invention will become more apparent upon reading of the following non-restrictive description of some embodiments thereof, given by way of example only with reference to the accompanying drawings.

DETAILED DESCRIPTION

Figure 1:
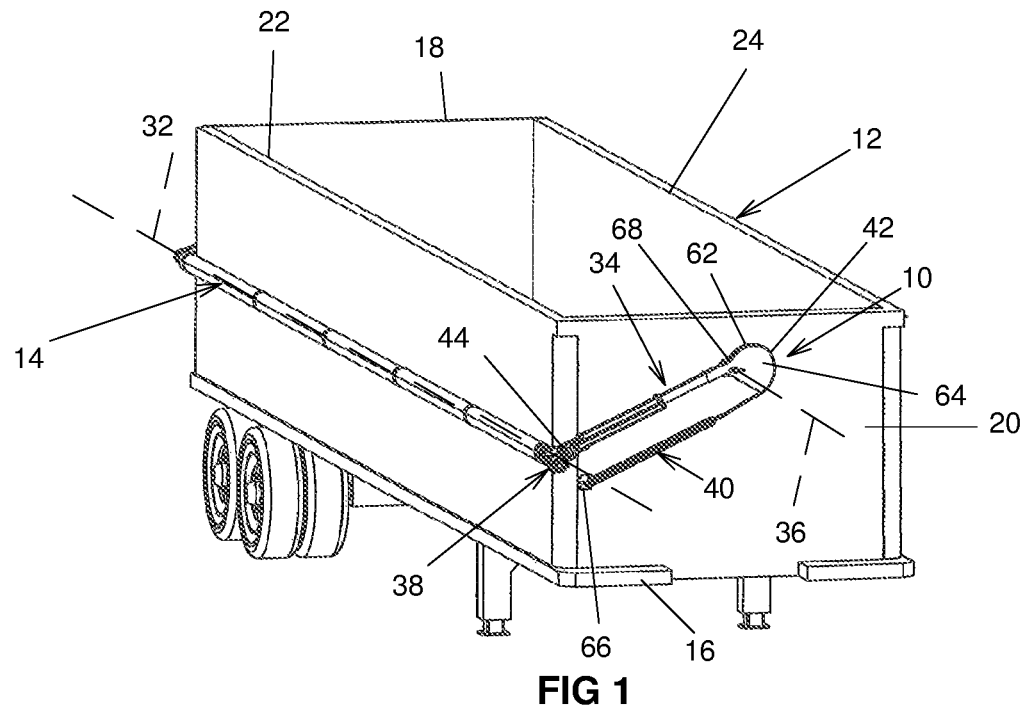
FIG. 1, in a perspective view, illustrates a container and a device for manipulating a tarpaulin in accordance with an embodiment of the present invention, the device being used to selectively cover and uncover a top aperture of the container, the tarpaulin being shown in a retracted configuration and positioned below the top aperture.
Figure 2:
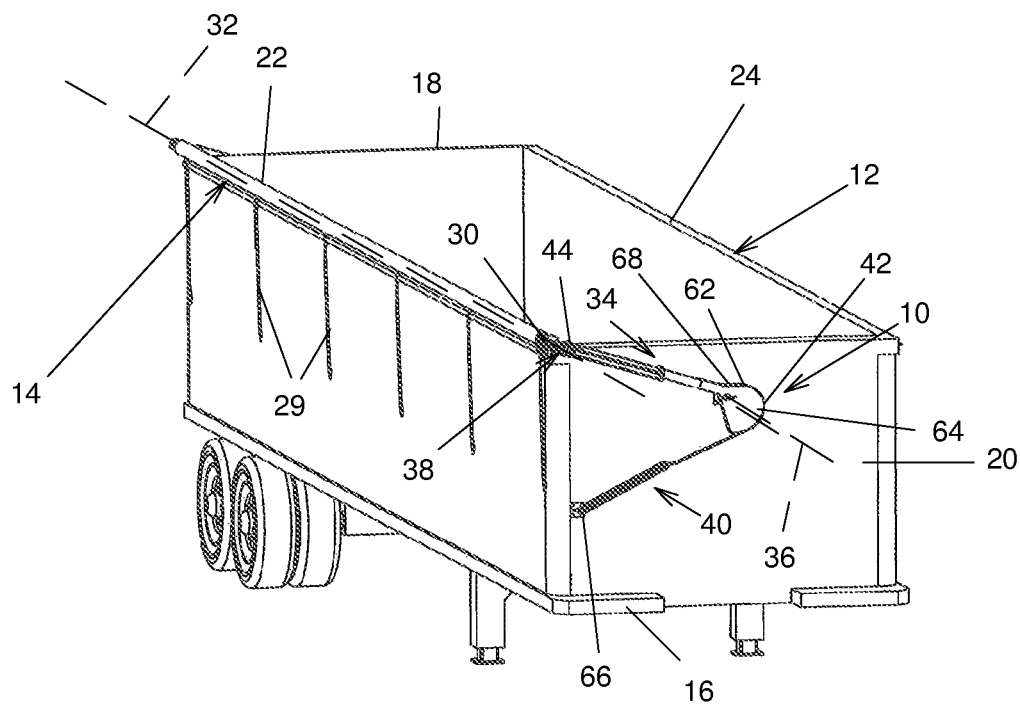
FIG. 2, in a perspective view, illustrates the container and device for manipulating a tarpaulin of FIG. 1, the tarpaulin being shown in the retracted configuration and positioned adjacent top aperture.
Figure 3:
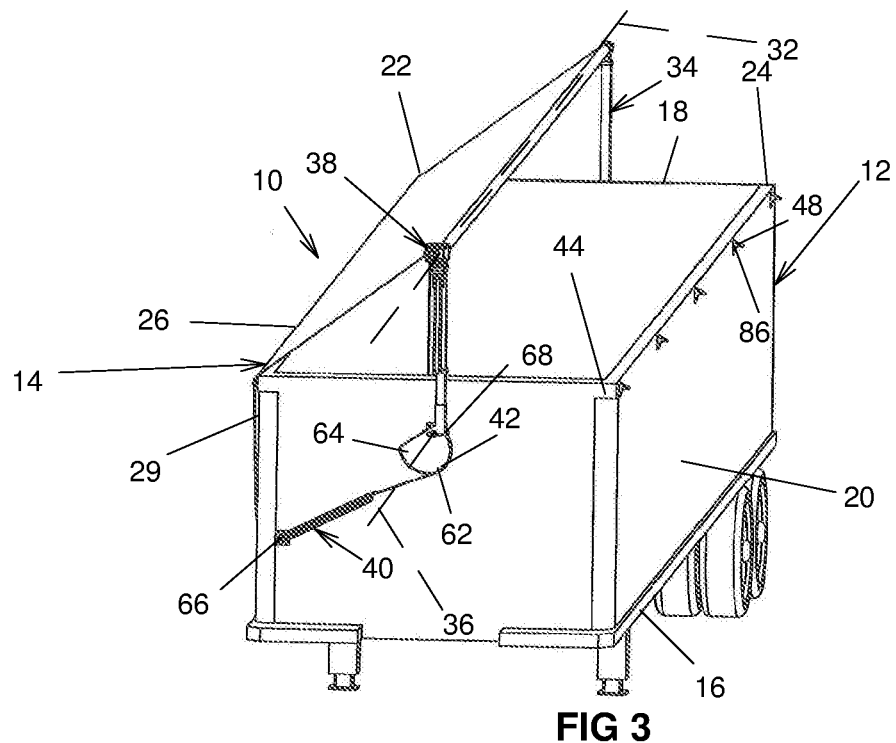
FIG. 3, in a perspective view, illustrates the container and device for manipulating a tarpaulin of FIGS. 1 and 2, the tarpaulin being shown in a partially extended configuration.

Referring to FIGS. 1 to 4, there is shown a device 10 for covering at least part of a container 12 using a tarpaulin 14, the container 12 defining a container bottom wall 16, a container peripheral wall 20 extending therefrom and a container top aperture 18, seen in FIGS. 1 to 3, delimited by the container peripheral wall 20 substantially opposed to the container bottom wall 16. As seen in FIG. 1, the container top aperture 18 defines an aperture first end 22 and a substantially opposed aperture second end 24. The container 12 is typically part of a vehicle or a trailer to be pulled by a vehicle. For example, the container 12 is mountable on a platform truck, an open top truck trailer or the bin of a dump truck, among other possibilities. However, the device 10 is usable with other suitable containers 12.

It should be noted that the aperture first and second ends 22 and 24 are not necessarily at the front or rear of the container 12, front and rear being related to the direction in which the container is moved by the vehicle. As shown in the drawings, the aperture first and second ends 22 and 24 may be on the sides of the container 12. In the context of a movable container 12, FIGS. 1 to 4 illustrate a case in which the container 12 is moved in a direction perpendicular to a line joining the aperture first and second ends 22 and 24. The tarpaulin 14 is therefore retracted laterally relative to the direction of motion. However, it is within the scope of the invention to have tarpaulins 14 retractable along the direction of motion.

The term "substantially" is used throughout this document to indicate variations in the thus qualifies terms. These variations are variations that do not materially affect the manner in which the invention works and can be due, for example, to uncertainty in manufacturing processes or to small deviations from a nominal value that do not cause significant changes to the invention. These variations are to be interpreted from the point of view of the person skilled in the art. Also, directional terminology such as below and horizontal, among others, is used in this document and refer to the device 10 and container 12 in a typical operational configuration. This terminology is used for clarity reasons and should not be used to restrict the scope of the appended claims unless explicitly mentioned in the claims.

Figure 4:
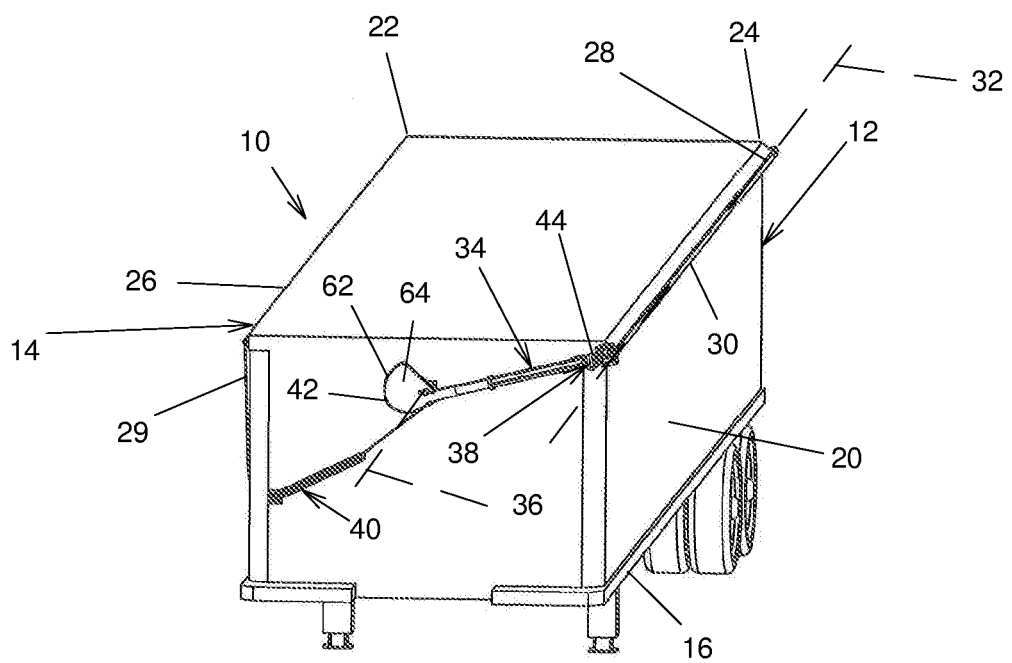
FIG. 4, in a perspective view, illustrates the container and device for manipulating a tarpaulin of FIGS. 1 to 3, the tarpaulin being shown in an extended configuration.

As better seen in FIG. 4, the tarpaulin 14 defines a tarpaulin first end 26 and a substantially opposed tarpaulin second end 28. The tarpaulin 14 is secured to the container 12 at the tarpaulin first end 26 substantially opposed to the aperture second end 28 and movable between tarpaulin retracted and extended configurations, seen respectively in FIGS. 2 and 4, in which the tarpaulin 14 is respectively substantially retracted from the container top aperture 18 and extended across the container top aperture 18. The tarpaulin 14 may be directly secured to the container 12, or may be secured thereto indirectly, for example through anchoring straps 29, better seen in FIG. 2, that extend between the tarpaulin 14, at the tarpaulin first end 26 for example, and the container 12. When present, the anchoring straps 29 are secured to the container 12, for example to the container peripheral wall 20 below the aperture first end 22. The tarpaulin 14 is secured to the container 12 substantially opposed to the aperture second end 28 so that when extended, the tarpaulin 14 extends across the top aperture 18. To that effect, the tarpaulin 14 may be secured to the container peripheral wall 20 below the aperture first end 26, as shown in the drawings, or adjacent the aperture first end 26, among other possibilities.

The device 10 includes a rod 30, a support arm 34, a rod actuator 38 and an arm biasing element 40. The rod 30 defines a rod longitudinal axis 32. The tarpaulin 14 is mountable to the rod 30 at the tarpaulin second end 28 to allow rolling of the tarpaulin 14 thereonto and unrolling of the tarpaulin 14 therefrom when the rod 30 is rotated about the rod longitudinal axis 32. The rod longitudinal axis 32 is typically substantially parallel to the container bottom wall 16 when the device 10 is operatively mounted to the container 12.

The support arm 34 is mountable to the container 12 for supporting the rod 30. The rod 30 is rotatably mounted to the support arm 34 so as to be rotatable about the rod longitudinal axis 32. When the support arm 34 is operatively mounted to the container 12, the support arm 34 is pivotally movable relative to the container 12 about an arm pivot axis 36, which is for example substantially parallel to the rod longitudinal axis 32, between support arms first and second positions, seen respectively in FIGS. 2 and 4, in which the rod 30 is respectively substantially adjacent the aperture first and second ends 22 and 24. While devices 10 including a single support arm 34 are within the scope of the invention, typically, the device 10 includes a pair of support arms 34 opposed to each other relative to the container top aperture 18, each support arm supporting the rod 30 at one end thereof, the support arms 34, the arm pivot axis 36 being common to both support arms 34. Also, in some embodiments, the support arm 34 is further movable to a support arm third position wherein the rod 30 is below the container top aperture 18 and substantially adjacent the container peripheral wall 20. The support arm 34 may thus pivot over at least 180 degrees in some embodiments. In some embodiments, in the support arm third position, the rod 30 is below the arm pivot axis 36. The support arm third position is helpful in that the rod 30 and tarpaulin 14 are then relatively far away from the container top aperture 18, which protects the device 10 while the container 12 is filled from above.

The support arm 34 may be directly mounted to the container 12 through an axle extending therethrough, or may be mounted to the container 12 through an arm mounting element 84 securable to the container 12. The support arm 34 is then being pivotally mounted to the arm mounting element 84.

The rod actuator 38 is operatively coupled to the rod 30 for selectively rotating the rod 30 about the rod longitudinal axis 32. While the device 10 includes typically a pair of support arms 34, the device 10 typically requires only one rod actuator 38, although the use of two rod actuators 38 is within the scope of the present invention.

The arm biasing element 40 is operatively coupled to the support arm 34 for biasing the support arm 34 towards the support arm second position. Depending on the specific application contemplated, when two support arms 34 are present, the device 10 may include only one arm biasing element 40, or a pair of arm biasing elements 40, each coupled to one of the support arms 34.

Rotating the rod 30 using the rod actuator 38 to roll the tarpaulin 14 therearound moves the support arm 34 towards the support arm first position to move the tarpaulin 14 to the tarpaulin retracted configuration and rotating the rod 30 using the rod actuator 38 to unroll the tarpaulin 14 therefrom moves the support arm 34 towards the support arm second position to move the tarpaulin 14 to the tarpaulin extended configuration.

Figures 5, 6:
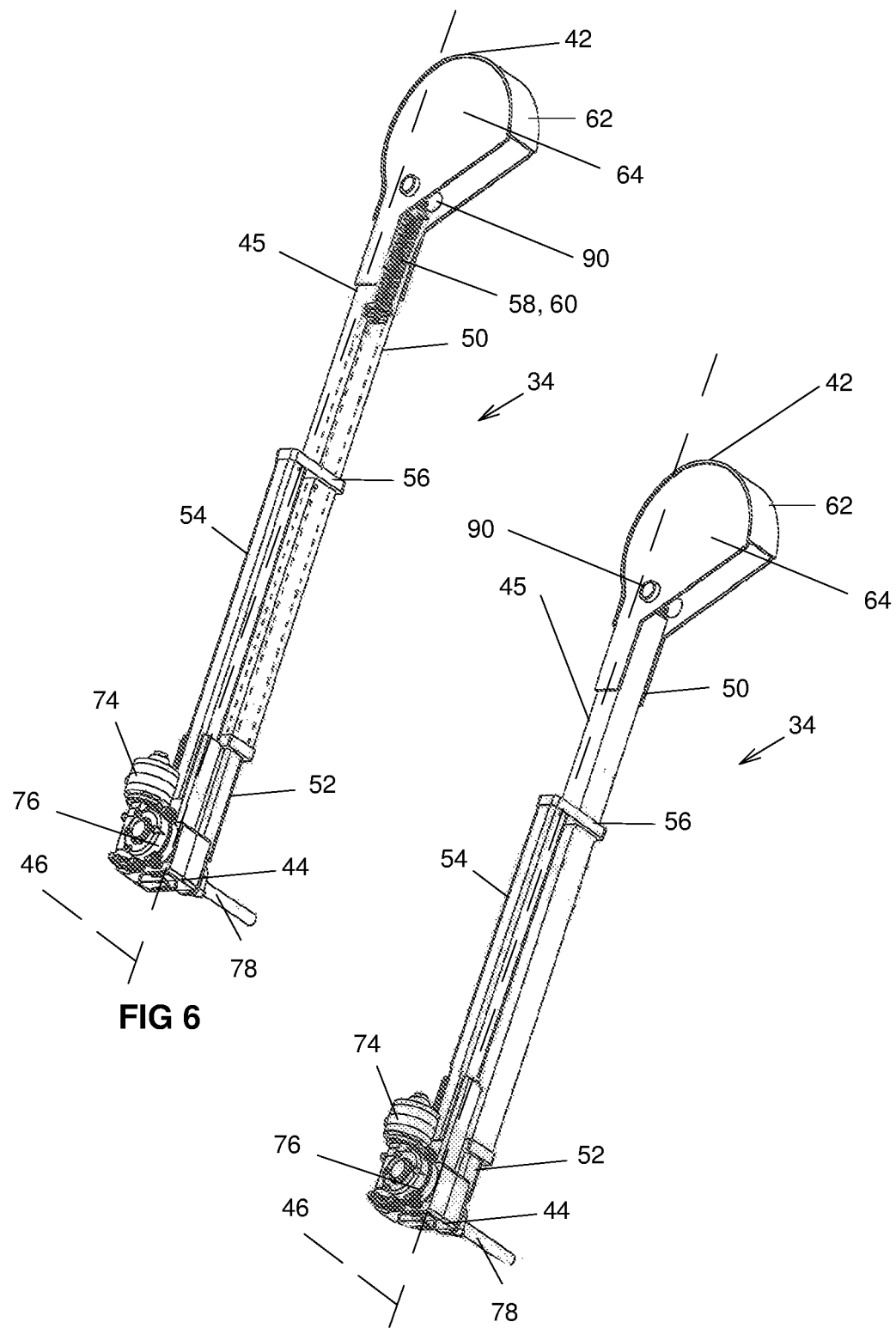
FIG. 5, in a perspective view, illustrates a support arm part of the device for manipulating a tarpaulin of FIGS. 1 to 4, the support arm being shown in a support arm retracted configuration.
FIG. 6, in a perspective view with parts removed, illustrates the support arm of FIG. 5, the support arm being shown in a support arm extended configuration.

Referring to FIG. 5, the support arm 34 defines support arm first and second ends 42 and 44. The support arm 34 is mountable to the container 12 substantially adjacent the support arm first end 42. The rod 30 is mounted to the support arm 34 substantially adjacent the support arm second end 44. The support arm 34 is typically substantially elongated and defines an arm longitudinal axis 46 extending between the support arm first and second ends 42 and 44.

In some embodiments (not shown in the drawings), the support arm 34 is of fixed length. In other embodiments, as shown in the drawings, the support arm 34 is telescopic to allow substantially longitudinal movements of the support arm first and second ends 42 and 44 relative to each other between support arm extended and retracted configurations, as better seen respectively in FIGS. 6 and 5. Telescopic support arms 34 are useful when the device 10 includes anchoring blocks 48 mountable to the container 12 substantially adjacent the aperture second end 24 are used, as seen in FIG. 3. The anchoring blocks 48 are used for receiving the rod 30 when the tarpaulin 14 is in the tarpaulin 14 extended configuration, and the telescopic movement of the support arm 34 allows extension of the support arm 34 to clear the edge of the anchoring blocks 48 followed by retraction of the support arm 34 to secure the rod 30 to the anchoring blocks 48. The telescopic nature of the support arm 34 may also be useful to minimize the need for very precise adjustment of the support arm 34 to the container 12 as the edges of the container peripheral wall 20 can be cleared by stretching slightly the support arm 34 if needed during pivotal movement of the support arm 34.

To be telescopic, the support arm 34 includes a support arm first element 50 and a support arm second element 52 substantially longitudinally movable relative to each other, typically while maintaining a fixed angular position about the arm longitudinal axis 46, and defining respectively the support arm first and second ends 42 and 44. For example, the support arm first element 50 may be include a tubular portion 45 and slidably receive therein part of the support arm second element 52. In some embodiments, the support arm second element 52 may be provided with a reinforcing member 54 extending generally parallel to the support arm first element 50, outside thereof, that defines a mounting collar 56 slidably mounted to the support arm first element 50. However, in some embodiments, the reinforcing member 54 is omitted. When present, the reinforcing member is typically coupled to the rod actuator 38 to allow prevent rotation of the rod actuator 38 relative to the support arm 34 about the arm longitudinal axis 46.

In some embodiments, a telescoping biasing element 58, seen in FIG. 6, is operatively coupled to the support arm first and second elements 50 and 52 to bias the support arm first and second elements 50 and 52 towards an equilibrium position relative to each other. For example, the equilibrium position corresponds to a shortest distance possible between the support arm first and second ends 42 and 44 given the specific construction of the support arm 34. However, in other embodiments, no telescoping biasing element 58 is provided. For example, telescopic movements of the support arm 34 may then be performed by a telescoping actuator, such as an hydraulic cylinder, among other possibilities.

In the embodiment of the invention shown in the drawings, the telescoping biasing element includes a coil spring 60 extending between the support arm first and second elements 50 and 52. However, other types of telescoping biasing elements, such as a resiliently stretchable band, among others, are within the scope of the present invention. The coil spring 60 is provided in the support arm first element 50 and has its ends firmly secured to the support arm first and second elements 50 and 52.

The support arm 34 defines a cam surface 62 eccentric relative to the arm pivot axis 36 and curving therearound. For example, the cam surface 62 is substantially arc segment shaped and defined by a substantially hemicylindrical portion 64 of the support arm first element 50, from which the tubular portion 45 extends substantially opposed to the cam surface 62. The cam surface 62 may be centered or not relative to the arm pivot axis 36.

In some embodiments, mounting of the support arm 34 to the container 12 is made through an arm mounting element 84 described in further details hereinbelow. For example, the support arm 34 may include a mounting tube 90 extending along the arm pivot axis 36 when the support arm 34 is mounted to the container 12. The mounting tube 90 may be provided in the substantially hemicylindrical portion 64 and extending therethrough substantially perpendicular to the arm longitudinal axis 46. The mounting tube is hollow with open ends.

As seen in FIGS. 1 to 4, the arm biasing element 40 is for example substantially elongated and defines substantially opposed arm biasing element first and second ends 66 and 68. The arm biasing element 40 is mountable to the container 12 at the arm biasing element first end 66, for example substantially below the aperture first end 22. The arm biasing element 40 is flexible substantially adjacent the arm biasing element second end 68 and at least part of the arm biasing element 40 is substantially resiliently stretchable. The arm biasing element 40 is mounted to the support arm 34 at the arm biasing element second end 68 so that at least part of the arm biasing element 40 is rolled against the cam surface 62 and unrolled therefrom as the support arm 34 moves between the support arm first and second positions. The at least part of the arm biasing element 40 that is substantially resiliently stretchable is stretched as the arm biasing element 40 is rolled against the cam surface 62 and retracted as the arm biasing element 40 is unrolled therefrom. Mounting of the arm biasing element 40 to the container 12 and the support arm 34 is made in any suitable manner, for example using fasteners or soldering, among other possibilities.

In a typical embodiment, the arm biasing element 40 includes arm biasing element first and second portions 70 and 72, the arm biasing element second portion 72 being provided substantially adjacent the arm biasing element second end 68, the arm biasing element first portion 70 being more easily resiliently deformable than the arm biasing element second portion 72. For example, the arm biasing element first portion 70 is a coil spring and arm biasing element second portion 72 is a strap extending therefrom that is fixed on the cam surface 62 at one end thereof so as to have a smaller or larger portion thereof abutting against the cam surface 62, depending on the position of the support arm 34. However, any other suitable arm biasing element 40 is within the scope of the invention. For example, the arm biasing element 40 could be made of a resiliently stretchable strap. However, it is useful to have most of the elongation of the arm biasing element 40 in the portion thereof that does not contact the cam surface 62 to minimize friction in use.

Referring to FIGS. 5 and 6, in some embodiments, the rod actuator 38 includes a motor 74 mounted to the support arm 34 and operatively coupled to the rod 30 to selectively rotate the rod 30 about the rod longitudinal axis 32. For example, the motor 74 has its output coupled to a gearbox 76, which itself includes an output axle 78 that directly connects to the rod 30. Typically, the motor 74 is mounted to the support arm 34 substantially adjacent the rod 30, or in other words substantially adjacent the support arm second end 44, and is an electrical motor, an hydraulic motor or an air motor connected to a suitable power supply and controller (both not shown in the drawings) in a conventional manner.

Figure 7:
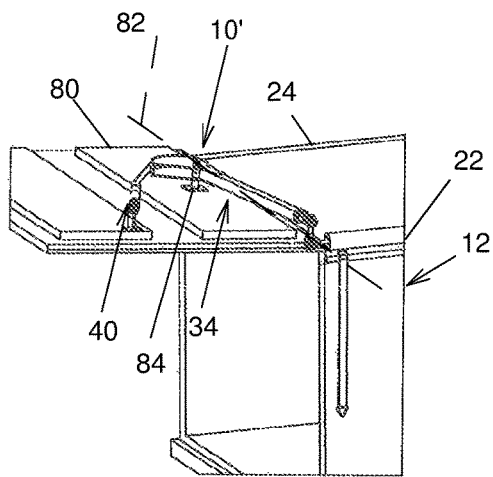
FIG. 7, in a partial perspective view, illustrates a container and a device for manipulating a tarpaulin in accordance with an alternative embodiment of the present invention, the device being used to selectively cover and uncover a top aperture of the container, the container including a pivotable door here shown in a door open position.
Figure 8:
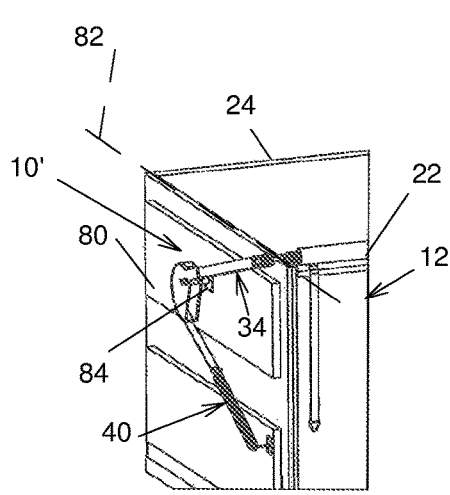
FIG. 8, in a partial perspective view, illustrates the container and the device for manipulating a tarpaulin of FIG. 7, the container being shown with the pivotable door in a door closed position.
Figure 9:
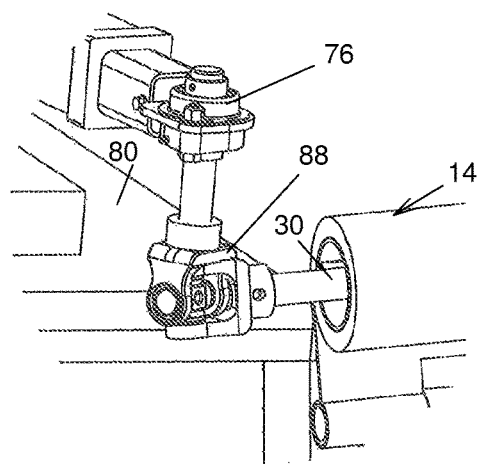
FIG. 9, in a perspective view, illustrates part of the device for manipulating a tarpaulin of FIGS. 7 and 8.

In alternative embodiments of the invention, as seen in FIGS. 7 and 8, the container 12 includes a container door 80 in the container peripheral wall 20 that pivots about a door pivot axis 82 that is substantially adjacent the container top aperture 18 and substantially parallel thereto. The door pivot axis 82 typically extends between the aperture first and second ends 22 and 24. This type of container doors 80 is often present in dump trucks. The support arm 34 may be mounted to the container door 80. To allow opening and closing of the container door 80, as seen in FIGS. 7 and 8, the device 10' of this embodiment may includes a universal joint 88 provided between the rod actuator 38 and the rod 30 to allow pivotal movements of the support arm 34 relative to the rod 30, as better seen in FIG. 9.

Figure 10:
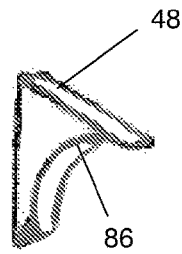
FIG. 10, in a perspective view, illustrates an anchoring block usable in the devices shown in FIGS. 1 to 9.

FIG. 10 illustrates the anchoring blocks 48 in greater details. The device 10 may include a plurality of anchoring blocks spaced apart from each other along the container top aperture 18 substantially adjacent the aperture second end 24. The anchoring blocks 48 are provided slightly below the aperture second end 24 and each define a recess 86, for example an inverted J-shaped recess 86. The recess 86 opens generally towards a plane containing the container bottom wall 16 when the anchoring blocks 48 are operatively mounted to the container 12 and the recess 86 is configured and sized for receiving the rod 30 thereinto when support arm 34 is in the support arm second position.

Figure 11:
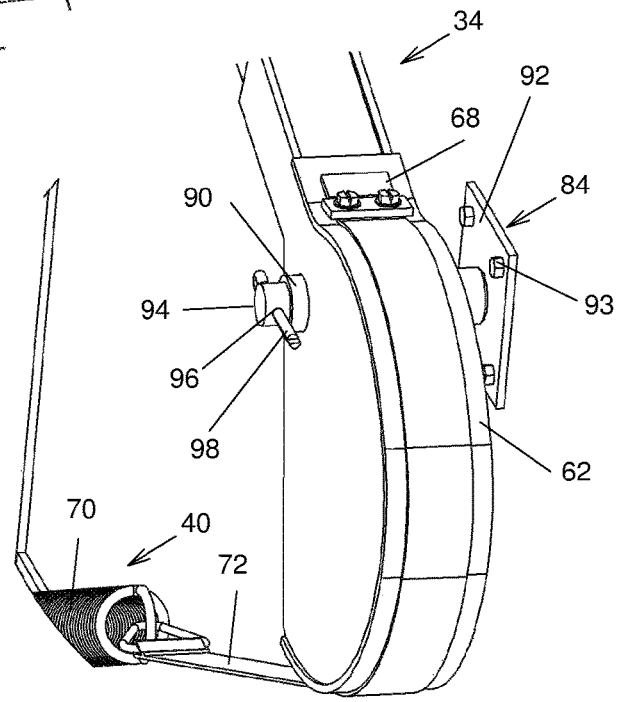
FIG. 11, in a perspective view, illustrates an arm mounting element usable in the devices shown in FIGS. 1 to 9.

FIG. 11 illustrates in greater detail the arm mounting element 84. The arm mounting element 84 includes a mounting plate 92 and an axle 94 extending therefrom, typically perpendicularly thereto. The mounting plate 92 is mounted in any suitable manner to the container 12, for example using bolts 93, or through welding or soldering, among other possibilities. The axle 94 is rotatably mounted in the mounting tube 90 to allow rotation of the support arm 34 relative to the arm mounting element 84. The axle 94 is maintained in the mounting tube 90 in any suitable manner. For example, and non-limitingly, the axle 94 defines a pin receiving aperture 96 opposed to the mounting plate 92 and extending generally perpendicular to the arm pivot axis 36 through which a pin 98 can be secured.

Operation of the device 10 is as follows. Taking for example as an initial configuration the configuration shown in FIG. 1, the support arm 34 is in the arm third position. The rod 30 is thus below the container top aperture 18. In this position, the arm biasing element 40 is maximally stretched. To extend the tarpaulin 14, the motor 74 is used to rotate the rod 30 in an unrolling direction to that that tarpaulin 14 is unrolled therefrom. This allows the arm biasing element 40 to shorten, and thus move the support arm 34 away from the arm third position. At first, only the anchoring straps 29 are unrolled from the rod 30. Typically the anchoring straps 29 have a length such that the are completely extended when the support arm reached the arm first position, as seen in FIG. 2.

At that point, the tarpaulin 14 is itself unrolled from the rod 30 as the rod 30 continues its rotation, until the support arm 34 is almost at the arm second position. If the arm pivot axis 36 is centered relative to the container 12, the support arm 34 need to stretch to the arm extended configuration to clear the edge of the anchoring blocks 48. One the anchoring blocks 48 have been cleared, the telescopic biasing element 58 shortens the support arm 34 to the arm retracted configuration, which secures the rod 30 in the recess 86. At that point, the motor 74 is deactivated and the rod 30 stops rotating. Performing the above steps in reverse, by rotating the rod 30 in a rolling direction opposite the unrolling direction, retracts the tarpaulin 14 from the container top aperture 18.

The cam surface 62 is configured to that the arm biasing element 40 gradually shortens as the support arm 34 moves between the arm third and second positions as described above. Therefore, the support arm 34 is biased so that the rod 30 is pulled away from the location at which the tarpaulin 14 is secured to the container 12 to maintain the anchoring straps 29 and tarpaulin 14 substantially taut as the rod 30 is turned.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. A device for covering at least part of a container using a tarpaulin, said container defining a container bottom wall, a container peripheral wall extending therefrom and a container top aperture delimited by said container peripheral wall substantially opposed to said container bottom wall, said container top aperture defining an aperture first end and a substantially opposed aperture second end, said tarpaulin defining a tarpaulin first end and a substantially opposed tarpaulin second end, said tarpaulin being secured to said container at said tarpaulin first end substantially opposed to said aperture second end and movable between tarpaulin retracted and extended configurations in which said tarpaulin is respectively substantially retracted from said container top aperture and extended across said container top aperture, said device comprising:
a rod defining a rod longitudinal axis, said tarpaulin being mountable to said rod at said tarpaulin second end to allow rolling of said tarpaulin thereonto and unrolling of said tarpaulin therefrom when said rod is rotated about said rod longitudinal axis;
a support arm mountable to said container for supporting said rod, said rod being rotatably mounted to said support arm so as to be rotatable about said rod longitudinal axis, wherein, when said support arm is operatively mounted to said container, said support arm is pivotally movable relative to said container about an arm pivot axis between support arms first and second positions in which said rod is respectively substantially adjacent said aperture first and second ends;
a rod actuator operatively coupled to said rod for selectively rotating said rod about said rod longitudinal axis; and
an arm biasing element operatively coupled to said support arm for biasing said support arm towards said support arm second position;
wherein rotating said rod using said rod actuator to roll said tarpaulin therearound moves said support arm towards said support arm first position to move said tarpaulin to said tarpaulin retracted configuration and rotating said rod using said rod actuator to unroll said tarpaulin therefrom moves said support arm towards said support arm second position to move said tarpaulin to said tarpaulin extended configuration.

2. The device as defined in claim 1, wherein
said arm biasing element is substantially elongated and defines substantially opposed arm biasing element first and second ends, said arm biasing element being mountable to said container substantially adjacent said arm biasing element first end, said arm biasing element being flexible substantially adjacent said arm biasing element second end, at least part of said arm biasing element being substantially resiliently stretchable;
said support arm defines a cam surface eccentric relative to said arm pivot axis and curving therearound; and
said arm biasing element is mounted to said support arm at said arm biasing element second end so that at least part of said arm biasing element is rolled against said cam surface and unrolled therefrom as said support arm moves between said support arm first and second positions, said at least part of said arm biasing element that is substantially resiliently stretchable being stretched as said arm biasing element is rolled against said cam surface and retracted as said arm biasing element is unrolled therefrom.

3. The device as defined in claim 2, wherein said cam surface is substantially arc segment shaped.

4. The device as defined in claim 2, wherein said arm biasing element includes arm biasing element first and second portions, said arm biasing element second portion being provided substantially adjacent said arm biasing element second end, said arm biasing element first portion being more easily resiliently deformable than said arm biasing element second portion.

5. The device as defined in claim 1, wherein
said support arm defines support arm first and second ends, said support arm being mountable to said container substantially adjacent said support arm first end and said rod being mounted to said support arm substantially adjacent said support arm second end, said support arm defining an arm longitudinal axis extending between said support arm first and second ends; and
said support arm is telescopic to allow substantially longitudinal movements of said support arm first and second ends relative to each other.

6. The device as defined in claim 5, wherein said support arm includes
a support arm first element and a support arm second element substantially longitudinally movable relative to each other and defining respectively said support arm first and second ends; and
a telescoping biasing element operatively coupled to said support arm first and second elements to bias said support arm first and second elements towards an equilibrium position relative to each other.

7. The device as defined in claim 6, wherein said equilibrium position corresponds to a shortest distance possible between said support arm first and second ends.

8. The device as defined in claim 7, wherein said telescoping biasing element includes a coil spring extending between said support arm first and second elements.

9. The device as defined in claim 5, further comprising an anchoring block mountable to said container substantially adjacent said aperture second end for receiving said rod when said tarpaulin is in said tarpaulin extended configuration, said anchoring block defining a recess opening generally towards a plane containing said container bottom wall when said anchoring block is operatively mounted to said container, said recess being configured and sized for receiving said rod thereinto when said support arm is in said support arm second position.

10. The device as defined in claim 1, wherein said rod actuator includes a motor mounted to said support arm and operatively coupled to said rod to selectively rotate said rod about said rod longitudinal axis, wherein said motor is mounted to said support arm substantially adjacent said rod.

11. The device as defined in claim 10, further comprising a universal joint provided between said motor and said rod to allow pivotal movements of said support arm relative to said rod.

12. The device as defined in claim 1, wherein said support arm is movable to a support arm third position wherein said rod is below said container top aperture and substantially adjacent said container peripheral wall.

13. The device as defined in claim 12, wherein in said support arm third position, said rod is below said arm pivot axis.

14. The device as defined in claim 1, further comprising an arm mounting element securable to said container, said support arm being pivotally mounted to said arm mounting element.

15. A container covering system for covering at least part of a container, said container defining a container bottom wall, a container peripheral wall extending therefrom and a container top aperture delimited by said container peripheral wall substantially opposed to said container bottom wall, said container top aperture defining an aperture first end and a substantially opposed aperture second end, said container covering system comprising:
  a tarpaulin defining a tarpaulin first end and a substantially opposed tarpaulin second end, said tarpaulin being securable to said container at said tarpaulin first end and movable between tarpaulin retracted and extended configurations in which said tarpaulin is respectively substantially retracted from said container top aperture and extended across said container top aperture;
  a rod defining a rod longitudinal axis, said tarpaulin being mounted to said rod at said tarpaulin second end to allow rolling of said tarpaulin thereonto and unrolling of said tarpaulin therefrom when said rod is rotated about said rod longitudinal axis;
  a support arm mountable to said container for supporting said rod, said rod being rotatably mounted to said support arm so as to be rotatable about said rod longitudinal axis, wherein, when said support arm is operatively mounted to said container, said support arm is pivotally movable relative to said container about an arm pivot axis between support arms first and second positions in which said rod is respectively substantially adjacent said aperture first and second ends;
  a rod actuator operatively coupled to said rod for selectively rotating said rod about said rod longitudinal axis; and
  an arm biasing element operatively coupled to said support arm for biasing said support arm towards said support arm second position;
  wherein rotating said rod using said rod actuator to roll said tarpaulin therearound moves said support arm towards said support arm first position to move said tarpaulin to said tarpaulin retracted configuration and rotating said rod using said rod actuator to unroll said tarpaulin therefrom moves said support arm towards said support arm second position to move said tarpaulin to said tarpaulin extended configuration.

16. The container covering system as defined in claim 15, further comprising anchoring straps extending from said tarpaulin at said tarpaulin first end and securable to said container peripheral wall below said container top aperture spaced apart therefrom.

17. The container covering system as defined in claim 15, wherein said support arm is movable to a support arm third position wherein said rod is below said container top aperture and substantially adjacent said container peripheral wall.

18. The container covering system as defined in claim 17, wherein in said support arm third position, said rod is below said arm pivot axis.

19. In combination, a container and a container covering system for covering at least part of said container, said container defining a container bottom wall, a container peripheral wall extending therefrom and a container top aperture delimited by said container peripheral wall substantially opposed to said container bottom wall, said container top aperture defining an aperture first end and a substantially opposed aperture second end, said container covering system comprising:
  a tarpaulin defining a tarpaulin first end and a substantially opposed tarpaulin second end, said tarpaulin being secured to said container at said tarpaulin first end substantially opposed to said aperture second end and movable between tarpaulin retracted and extended configurations in which said tarpaulin is respectively substantially retracted from said container top aperture and extended across said container top aperture;
  a rod defining a rod longitudinal axis, said tarpaulin being mounted to said rod at said tarpaulin second end to allow rolling of said tarpaulin thereonto and unrolling of said tarpaulin therefrom when said rod is rotated about said rod longitudinal axis;
  a support arm mounted to said container for supporting said rod, said rod being rotatably mounted to said support arm so as to be rotatable about said rod longitudinal axis, wherein said support arm is pivotally movable relative to said container about an arm pivot axis between support arms first and second positions in which said rod is respectively substantially adjacent said aperture first and second ends;
  a rod actuator operatively coupled to said rod for selectively rotating said rod about said rod longitudinal axis; and
  an arm biasing element operatively coupled to said support arm for biasing said support arm towards said support arm second position;
  wherein rotating said rod using said rod actuator to roll said tarpaulin therearound moves said support arm towards said support arm first position to move said tarpaulin to said tarpaulin retracted configuration and rotating said rod using said rod actuator to unroll said tarpaulin therefrom moves said support arm towards said support arm second position to move said tarpaulin to said tarpaulin extended configuration.

20. The combination as defined in claim 19, wherein said container covering system further comprises anchoring straps extending from said tarpaulin at said tarpaulin first end and secured to said container peripheral wall below said container top aperture spaced apart therefrom.

21. The combination as defined in claim 19, further comprising an anchoring block mounted to said container substantially adjacent said aperture second end for receiving said rod when said tarpaulin is in said tarpaulin extended configuration, wherein said anchoring block defines a recess opening generally towards a plane containing said container bottom wall, said recess being configured and sized for receiving said rod thereinto when said support arm is in said support arm second position.

22. The combination as defined in claim 19, wherein said rod actuator includes a motor mounted to said support arm and operatively coupled to said rod to selectively rotate said rod about said rod longitudinal axis.

23. The combination as defined in claim 22, wherein said motor is mounted to said support arm substantially adjacent said rod and wherein said container includes a container door in the container peripheral wall, said container door pivoting about a door pivot axis substantially adjacent said container top aperture and substantially parallel thereto, said support arm being mounted to said container door, said container covering system further comprising a universal joint provided between said motor and said rod to allow pivotal movements of said support arm relative to said rod.

24. The combination as defined in claim 19, wherein said support arm is movable to a support arm third position wherein said rod is below said container top aperture and substantially adjacent said container peripheral wall.

25. The combination as defined in claim 24, wherein in said support arm third position, said rod is below said arm pivot axis.

* * * * *